United States Patent [19]

Feurer

[11] 4,390,482
[45] Jun. 28, 1983

[54] METHOD FOR MOLDING CONTACT LENSES USING MICROWAVE ENERGY

[75] Inventor: Bernard Feurer, Saint-Orens-de Gameville, France

[73] Assignee: Alcon Pharmaceuticals Limited, Cham, Switzerland

[21] Appl. No.: 238,963

[22] Filed: Feb. 27, 1981

[30] Foreign Application Priority Data

Feb. 28, 1980 [FR] France ............... 80 04751

[51] Int. Cl.$^3$ ............................................. B29D 11/00
[52] U.S. Cl. ........................................ 264/1.4; 264/25; 264/337; 425/808
[58] Field of Search ..................... 264/1.4, 25, 337; 425/808

[56] References Cited

U.S. PATENT DOCUMENTS

| | | | |
|---|---|---|---|
| 3,171,869 | 3/1965 | Weinberg | 264/2.3 |
| 4,073,577 | 2/1978 | Hofer | 264/1.4 |
| 4,121,896 | 10/1978 | Shepherd | 264/2.2 |
| 4,138,086 | 2/1979 | Mizutani | 425/808 |
| 4,159,292 | 6/1979 | Neefe | 264/1.4 |
| 4,166,088 | 8/1979 | Neefe | 264/2.2 |
| 4,179,484 | 12/1979 | Neefe | 264/1.4 |
| 4,209,289 | 6/1980 | Newcomb | 425/410 |

*Primary Examiner*—James B. Lowe
*Attorney, Agent, or Firm*—Shlesinger, Arkwright, Garvey & Dinsmore

[57] ABSTRACT

The invention relates to a fabrication method for molding a contact lens with the required optical qualities.

This method consists in designing a mold (1, 2) of high thermal inertia, which is transparent to, or little absorbing the electromagnetic microwave frequencies between $10^6$ Hz and $10^{11}$ Hz, in developing a base composition from polymerizing double-bond monomers which are absorbing with respect to the above microwaves, and in ensuring the polymerization of the composition within the closed mold by irradiation with the above cited electromagnetic waves at a power density suited to keep the temperature at the mold level approximately below 40° C.

12 Claims, 4 Drawing Figures

METHOD FOR MOLDING CONTACT LENSES USING MICROWAVE ENERGY

The invention concerns a fabrication method for molding contact lenses, whereby a finished product is obtained with the required optical qualities to be placed in contact with an eye and assure the desired corrections.

It is known that the contact lenses have been conventionally machined from blanks or disks made by polymerizing a synthetic monomeric composition; these disks or blanks as a rule are made by polymerizing in molds without attending particular difficulties in manufacture, as the optical surfaces are subsequently machined from them.

This machining of the disks to impart a definitive shape to the lenses with the required optical properties represents a costly, delicate and lengthy operation requiring numerous and specialized personnel. In order to eliminate this machining operation, it has been suggested to fabricate the contact lenses directly by molding, providing for the polymerization of the base composition in a closed mold which in a hollow shape renders the final shape of the lens to be achieved.

However this mode of fabrication runs into a problem which in practice is extremely difficult to solve in order to obtain lenses of which the surfaces offer the required optical properties and the edges both adequate thinness and contours so as to be physiologically tolerated by the eye. As a matter of fact, in the course of the polymerization, which as a rule is carried out at a temperature of roughly 60° to 70° C., detachments of the lens material from the mold have been observed, with formation of minute pockets between the lens and the mold walls. The lenses so made cannot be used, and accordingly, despite their apparent interest, these molding methods so far have failed to prove economically effective in commercial manufacture.

Experts who have considered the problem have explained the lens detachment and the pocket formation as a shrinkage phenomenon undergone by the hot substance during polymerization.

Thus, in the French patent application #77.08393, the problem tentatively was resolved by making a special mold provided with elastic lips at its periphery for the purpose of filling the empty space tending to form around the lens so as to avert lens detachment and pocket formation as cited above.

Some improvement is obtained in this manner, reinforcing the supposition that the difficulties arise from material shrinkage during polymerization.

However the process described in the above cited patent application requires making special-shape molds of which the very thin elastic lips tends to rapidly degrade. Moreover, and most of all, the rims of the lenses made in these molds generally are fairly thick and rather irregular; when applied, such lenses suffer the drawback of being frequently moved by the lids which catch on their rims.

Furthermore, certain methods are making use of non-hermetic molds with open rims at their peripheries, these methods consisting in pouring excess material into these molds, said excess being evacuable through the open rims (for instance French patent #2,270,082). However, these processes require refinishing these lenses to machine their rims after molding. Again, as regards this type of method, setting up the molding operation is much more complex and delicate, as the polymerization must take place progressively from the center toward the rims of the molds. As a rule, the polymerization conditions are so adjusted that it will take place in two phases, first an onset of polymerization at the center of the mold (during which polymerization of the rims is avoided), next a peripheral polymerization.

The object of the present invention is a molding manufacturing process wherein a base composition is polymerized in a hermetic mold consisting of parts tightly closed one against the other and rendering in hollow shape the lens to be made.

It is also the object of the invention to offer a solution to the above-cited molding problem without incurring the drawbacks of the known solutions.

A particular object of the invention is to permit a single-stage manufacture of a lens with appropriate optical surfaces and thin edges of suitable qualities by molding in a closed mold.

Another object is to offer a process for implementation in molds of simple designs, without risks of rapid wear.

To that end, the manufacturing process of the invention to achieve corneal lens of adequate optical quality by polymerizing a base composition in a closed mold consists in: making a mold of a transparent or only slightly absorbent material with respect to electromagnetic microwaves with frequencies approximately between $10^6$ and $10^{11}$ Hz, where said mold is so designed its thermal inertia is much higher than that of the amount of base composition required to make a lens, developing a base composition from one or more polymerizing double-bond monomers, with absorbing properties regarding the above-cited microwaves;

and ensuring the polymerization of the composition inside the closed mold by irradiating the whole set with microwaves of the above cited frequencies and a power density suited to keep the temperature at the mold approximately less than 40° C.

It is observed when implementing such a method that the lens material remains applied to the mold and perfectly hugs its shape, both in the central region and along the lens rim. At the termination of polymerization, the lens comprises an optically satisfactory surface state, and especially regular edges reproducing the non-deforming geometry of the mold at that location. Due to an appropriate shape of the mold, these rims therefore may be fairly thin, progressively decreasing to meet the requirements of the corneal lenses, and thus are achieved in reproducible manner during successive mass moldings of lenses.

This unexpected result probably is due to the two following facts: on one hand, contrary to what was believed, the formation of the pockets in the conventional methods is due to at least as much to the hot differential expansions of the mold and of the base composition than to latter's shrinkage, and on the other hand the shrinkage incurred in the course of low-temperature polymerization of the base composition by themselves are insufficient to cause detachment.

The process of the invention achieves dissipation of the energy required for polymerization at the core of the lens by averting its excessive heating, and especially by avoiding heating the mold which practically absorbs no energy and has a high thermal inertia with respect to the lens material. If appropriate, the mold also can be externally cooled to ensure a better temperature control.

Under these conditions, substantial expansions are eliminated in the mold, which it appears are among the essential grounds for the difficulties met with in conventional methods, and at the same time, the shrinkage of the lens material are becoming acceptable.

Preferably the irradiation is carried out with microwave frequencies between $2 \times 10^8$ and $4. \cdot 10^9$ Hz. In particular industrial frequencies may be selected (915 MHz or 2,450 MHz) whereby commonplace equipment is available. Moreover, within this wavelength band, it is easy to find a mold material which is hardly absorbing, for instance an uncharged polymer designed for dielectric applications (low dielectric losses) such as pure polypropylene, polyethylene or polytetrafluoroethylene, whereas numerous polymerizing, double-bond, monomeric compounds offer absorption with respect to these electromagnetic waves (asymmetric molecules susceptible to vibration by microwave excitation), in particular the allyl and vinyl monomers.

Preferably a polymerization initiator is mixed into the base composition, for instance azobis isobutyronitrile, peroxides, persulfates etc. At the onset of the process, this initiator will absorb the heat generated by the microwave frequencies at the core of the composition, will decompose and facilitate the initiation of polymerization.

It is understood of course that the mold material must be compatible with the polymerizing base composition, that is, it must be perfectly neutral with respect to it.

Preferably the irradiation shall be such that the power density at the level of the set of mold and base-composition is between $0.5 \times 10^{-3}$ and $1000 \times 10^{-3}$ watt/cm$^3$.

As a rule this power level suffices to initiate the polymerization reaction and to suitably maintain it, while keeping a moderate temperature at less than 40° C., and in particular between 20° and 35° C.

As a base composition, preferably a monomer or a mixture of monomers with large-volume molecules will be selected, in particular from the following group: hydroxyethyl methacrylate, hydroxypropylmethacrylaye, hyroxyethylacrylate, ethyleneglycoldimethyacrylate, vinyl pyrrolidone, glycidyl methacrylate, methacrylamide, bisphenol A dimethacrylate, bisphenol A bis(2 hydroxypropyl methacrylate); these monomers shrink little during low-temperature polymerization, so that wholly satisfactory lens quality can be obtained.

The monomer or the mixture of monomers constituting the base composition can be mixed with linear polymers, whereby the shrinking in the course of polymerization may be further reduced and in certain applications the result may be improved; in particular the following linear polymers may be mixed: polyglycidyl methacrylate, polymethyl, polyvinyl pyrrolidone.

The method of the invention can be implemented at atmospheric pressure and in fact it will be so carried out in practice as a rule in order to reduce equipment cost; it has been noted however than an increase in pressure is a favorable factor and in some conditions operation may be at a pressure of the order of 2 to 10 bars.

The mold used practically must involve a material mass at least 20 times higher than that of the base composition material required to make a lens, in order to ensure satisfactory temperature control by thermal inertia. For instance for a lens of 0.03 g, a two-part mold may be used, each part with a mass of about one gram.

Where appropriate, the external mold surface may be cooled by a moving fluid.

The description below is non-restricting and illustrates several implementing modes of the method of the invention that were carried out using equipment and a mold such as are shown diagrammatically in the attached drawings.

Before discussing the specific conditions for the implementing examples, the material properties making this implementation possible, also the conditions relating to the method which are common to the various examples will first be stated.

The method described in the example has as its object the molding manufacture of hydrophilic contact lenses (or soft lenses), offering after molding all the required properties (optical, mechanical and geometric) without need for machining or other finishing operations.

Figure 1:
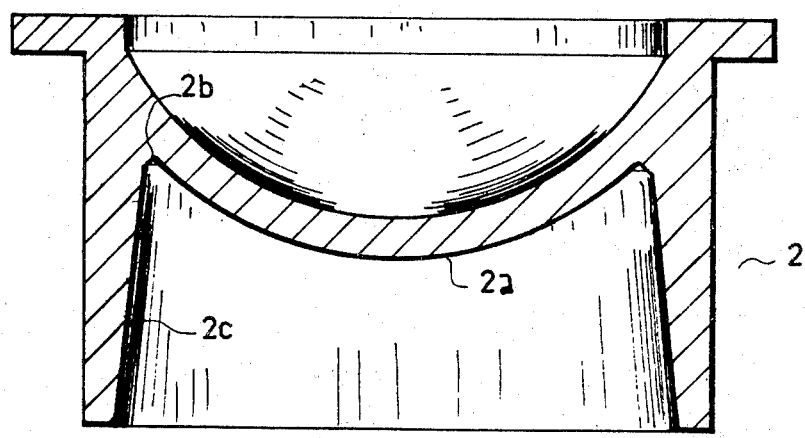
FIG. 1 is an axial section of the two mold parts, shown apart.
Figure 1:
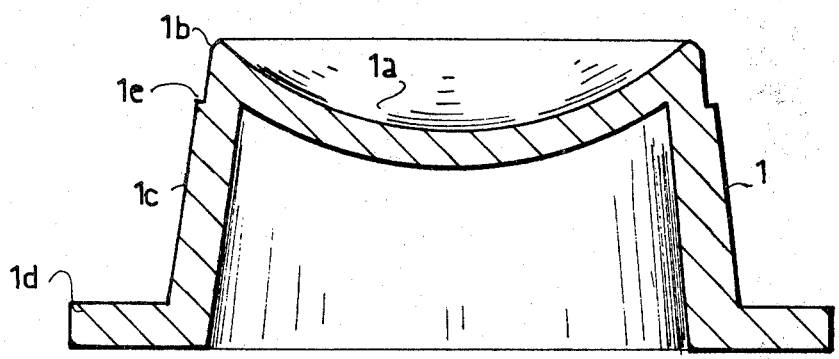

To that end use is made of mold consisting of two parts 1 and 2 (FIG. 1). This mold is made from a material transparent to microwave frequencies and chemically inert with respect to the generally used base compositions for hydrophilic lenses (mixtures of allyl and vinyl monomers.

Moreover, the mold material must allow easy ejection of the lens. It must also permit obtaining a molding surface with a grade of "mirror finish" compatible with the optical quality required of the final lens.

As regards the examples below, the mold is made of pure, non-charged propylene, that is, it contains no additive at all that would be absorbing with respect to the radiation used. The two mold parts are obtained by injection. Obviously, the molds if appropriate also can be machined and buffed and made by any other way.

The part 1 comprises a concave side 1a with a radius $R_a$ equal to the radius of the convex side of the lens to be made. This side 1a extends by a peripheral flat sector 1b sloping outward.

On the outside, this part comprises a slightly conical wall 1c interrupted at the top to form a peripheral recess 1e which will receive the excess of base composition forced out when the two mold parts have come together.

In the example, the part 1 furthermore is hollowed out in its non-working volume to permit accurate mold fabrication by injection; this part is supported by a small peripheral flange 1d.

The overall diameter of this part is about 15 mm and its weight is about 1 gram.

The other part 2 of the mold will slip over the first part 1; its weight is of the same order. It comprises a convex side 2a with a radius $R_o$ equal to that of the concave side of the lens to be made.

This side 2a continues by a flat surface 2b, conjugate to the flat surface 1b, and will come to rest against it.

This mold part 2 furthermore comprises a conical wall 2c so shaped it will come to rest against the wall 1c and provide a good sealing effect due to resting against a large area.

Figure 2:
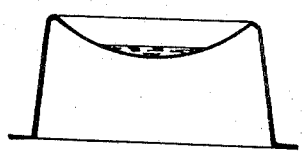
FIGS. 2 and 3 are schematic views illustrating the introduction of the base material into the mold.

At the onset of the operations, the base composition is placed in slight excess in the mold part 1 inside the seat bounded by the concave side 1a, as schematically shown in FIG. 2.

Next the part 2 is placed on part 1 until the peripheral flat sectors 1b and 2b and the conical walls 1c and 2c are applied against each other.

In the course of this operation, the excess base composition is forced into the recess 1e. As a rule, the weight of the base composition remaining between the sides 1a and 2a will not exceed about 0.05 g for a hydrophilic lens of the current type.

Figure 3:
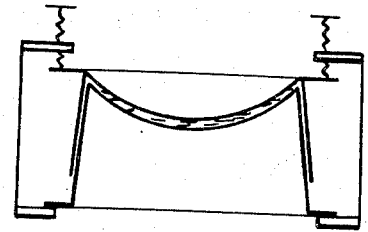
Figure 4:
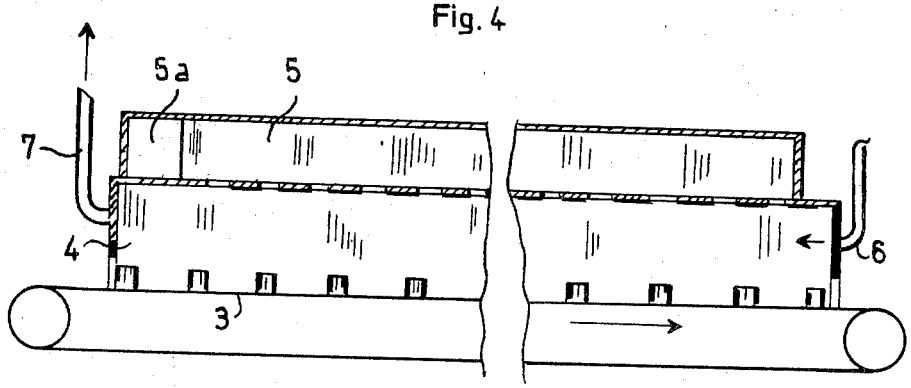
FIG. 4 is a schematic view of an irradiation duct to implement the method.

Thereupon a tightening means is put into place to keep the two mold parts forced one against the other (FIG. 3). Obviously this member is made of a material which is non-absorbant to the microwave frequencies.

The entire set now is ready for the polymerization stage. This set together with other molds which were readied in the same manner is placed on a silicone conveyor belt 3 (which is non-absorbing with respect to the microwave frequencies). This belt passes through a duct 4 associated with an irradiation waveguide 5 equipped with suitable radiation slots. The waveguide is conventionally connected to a microwave generator at one end 5a. Further, a conduit 6 allowing to blow an air flow of specific temperature into the duct 4 is provided, with a suction conduit 7 at the other end of the duct.

Such an installation allows irradiating the cut 4 with microwave frequencies which in this present case are of 2,450 megahertz; the power density is controllable.

No pocket at all was observed between the mold and the lens material in all the examples cited below, and the lenses so obtained provided wholly satisfactory optical and geometric properties. The polymer obtained at the end of polymerization is remarkably homogeneous across the entire volume of the lens, whereby a most favorable optical grade is made available.

Be it noted that the molds are rigid and comprise no fragile parts; they were used in many tests without apparent degradation.

EXAMPLE 1

The base composition enclosed in the shut mold is as follows:
hydroxyethyl methacrylate (Hema): 72.18% (weight)
hydroxypropyl methacrylate (Hpma): 23.75%
hydroxyethyl acrylate (Hea): 2.00%
ethyleneglycol dimethacrylate (Egdma): 0.05%
polyvinyl pyrrolidone (PVP): 2.00%
azobis isobutyronitrile (AIBN): 0.016%

The temperature of the air flow blown-in through the conduit 6 was 20° C.

In this example, the molds were so arranged on the conveyor belt 3 that forty of them were simultaneously inside the duct. The belt speed was adjusted so that each mold would remain one hour in the duct.

The power density inside the duct was $40 \times 10^{-3}$ w/cm$^3$.

The lenses so made may absorb about 40% in water (by weight, with respect to the final hydrated-lens weight).

EXAMPLE 2 vinyl pyrrolidone (VP): 59.8%
glycidyl methacrylate (GMA): 35%
methacrylamide (MC): 5%
AIBN: 0.016%
air-flow temperature: 20° C.
number of molds on belt: 30
power density: $20 \times 10^{-3}$ w/cm$^3$
each mold's dwell time: 4 h
water absorption possible in finished lens: 70%

EXAMPLE 3

VP 59.8%
polyglycidyl methacrylate (PGMA): 39.9%
bisphenol A dimethylacetate (BPAD): 0.1%
AIBN: 0.016%
air flow temperature: 20° C.
number of molds on belt: 40
power density: $40 \times 10^{-3}$ w/cm$^3$
single-mold dwell time: 1 hour
proportion of absorbable water: 84%

Be it noted that the hydrophilic lenses can be prepared in the dry state, in the partly hydrated state or in the entirely hydrated state, by adding an appropriate amount of water to the base composition.

It is understood that the method of the invention also permits obtaining non-hydrophilic lenses by suitably selecting the base monomers.

I claim:

1. A method for producing a finished contact lens comprising:
providing a mold of male and female parts substantially transparent to microwave energy within the range of about $10^6$ Hz to $10^{11}$ Hz, said mold having a heat capacity significantly greater than the amount of the composition being molded whereby heat generated during molding may be dissipated without raising the temperature of said mold above about 40° C., each said male and female part having a unitary mold surface rigid at temperatures below about 40° C., said parts being adapted to interfit with the peripheries of said mold surfaces in contact so as to form an airtight closed mold cavity, said unitary male mold surface and said unitary female mold surface alone forming in its entirety the final undeformed shape of the lens to be molded, introducing a polymerizable lens forming monomer into said mold cavity and interfitting said mold parts so as to close said mold cavity, irradiating said monomer containing mold substantially uniformly with microwave energy at a frequency within the range of about $10^6$ Hz to $10^{11}$ Hz and at a power density such as to keep the temperature of said mold below about 40° C. so as to polymerize said monomer without detachment of the lens material from said mold surfaces and without deformation of said mold surfaces, and removing the lens from said mold.

2. A method as in claim 1 and wherein said polymerizable lens forming monomer is selected from the group consisting of allyl monomers, vinyl monomers, or a mixture of ally and vinyl monomers, and conducting said irradiation with microwave energy at a frequency of between $2 \times 10^8$ Hz and $4 \times 10^9$ Hz.

3. A method as in claim 1 and wherein said mold is formed from a non-charged polymer selected from the group consisting of polypropylene and polyethylene, and carrying out said irradiation with microwave energy at a frequency of between about $2 \times 10^8$ Hz and $4 \times 10^9$ Hz.

4. A method as in claim 1 and including adding a polymerization initiator to said polymerizable monomer.

5. A method as in claim 1 and wherein one of said mold surfaces is concave so as to form the convex side of the lens, and the other of said mold surfaces is convex so as to form the other side of said lens.

6. A method as in claim 1, 2, 3 or 4 and wherein said polymerizable lens forming monomer is selected from the group consisting of hydroxyethyl methacrylate, hydroxypropyl methacrylate, hydroxyethyl acrylate, ethyleneglycol dimethacrylate, vinyl pyrrolidone, glycidyl methacrylate, methacrylamide, bisphenol A bis(2 hydroxypropyl methacrylate).

7. A method as in claim 6 and wherein said polymerizable lens forming monomer includes at least one linear polymer selected from the group consisting of polyglycidyl methacrylate, polymethyl methacrylate, polyvinyl pyrrolidone.

8. A method as in claim 6 and including carrying out said irradiation step at substantially atmospheric pressure.

9. A method as in claim 6 and including carrying out said irradiation at a pressure of about 2 to 10 bars.

10. A method as in claim 6 and wherein said power density is between about $0.5 \times 10^{-3}$ and $1,000 \times 10^{-3}$ watt/cm$^3$.

11. A process as in claim 10 and including cooling said mold during said irradiation step.

12. A method as in claim 1, 2, 3 or 4 and wherein said mold has a mass at least 20 times the mass of said polymerizable lens forming monomer in said mold cavity.

* * * * *